US011931878B2

(12) United States Patent
Swaminathan et al.

(10) Patent No.: US 11,931,878 B2
(45) Date of Patent: Mar. 19, 2024

(54) QUICK CHANGE AUXILIARY HANDLE FOR POWER TOOL

(71) Applicant: Ingersoll-Rand Industrial U.S., Inc., Davidson, NC (US)

(72) Inventors: Vairavasundaram Swaminathan, Bangalore (IN); Dennis Naksen, Summit, NJ (US); Scott Turner, Jackson Springs, NC (US); William Durham, Statesville, NC (US); Jefferey C. Yaschur, Doylestown, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 256 days.

(21) Appl. No.: 17/085,356

(22) Filed: Oct. 30, 2020

(65) Prior Publication Data

US 2021/0060757 A1 Mar. 4, 2021

Related U.S. Application Data

(63) Continuation-in-part of application No. 16/552,227, filed on Aug. 27, 2019.

(51) Int. Cl.

*B25F 5/02* (2006.01)
*B25F 5/00* (2006.01)
*B25B 21/00* (2006.01)

(52) U.S. Cl.

CPC .............. *B25F 5/026* (2013.01); *B25F 5/001* (2013.01); *B25B 21/00* (2013.01)

(58) Field of Classification Search

CPC ........... B25F 5/026; B25F 5/001; B25B 21/00
See application file for complete search history.

(56) References Cited

U.S. PATENT DOCUMENTS

| | | | |
|---|---|---|---|
| D332,736 | S | 1/1993 | Mikiya |
| 5,195,042 | A | 3/1993 | Ferraro et al. |

(Continued)

FOREIGN PATENT DOCUMENTS

| | | | |
|---|---|---|---|
| CN | 103894990 | A | 7/2014 |
| CN | 107900987 | A | 4/2018 |

(Continued)

OTHER PUBLICATIONS

Alex Rennie. "The Best Air Hammers for Powering Through Your Metalworking Jobs." Popular Mechanics., Jun. 11, 2021 [online], [retrieved on Oct. 4, 2021]. Retrieved from the Internet https://www.popularmechanics.com/home/tools/g36653873/best-air-hammers/.

(Continued)

*Primary Examiner* — Andrew M Tecco
*Assistant Examiner* — Nicholas E Igbokwe
(74) *Attorney, Agent, or Firm* — Kevin E. West; Advent, LLP

(57) ABSTRACT

A power tool comprises an adjustable auxiliary handle assembly that facilities safe use of the tool by the operator while allowing convenient carry and storage of the tool when not in use. The adjustable auxiliary handle assembly comprises an indexing mechanism that includes an angled connector, a slidable latching mechanism and a handle base. The indexing mechanism allows a longitudinal handle to rotate and be locked in a position convenient and comfortable to the operator. The indexing mechanism is adjustable and can be operated with one hand (e.g., one-handed operation). The latching mechanism holds the auxiliary handle position in place while allowing the power tool to be used in high-torque/high load applications.

20 Claims, 12 Drawing Sheets

(56) References Cited

U.S. PATENT DOCUMENTS

| | | | | |
|---|---|---|---|---|
| 5,279,102 | A * | 1/1994 | Foster | A01D 34/63 56/DIG. 18 |
| 5,638,945 | A | 6/1997 | Fukinuki et al. | |
| D444,365 | S | 7/2001 | Bass et al. | |
| D459,644 | S | 7/2002 | Morgan | |
| D460,675 | S | 7/2002 | Morgan | |
| 6,467,585 | B1 | 10/2002 | Gozzo et al. | |
| D487,219 | S | 3/2004 | Chudy et al. | |
| D509,119 | S | 9/2005 | Schiller et al. | |
| 7,022,924 | B2 | 4/2006 | Patton | |
| 7,495,584 | B1 | 2/2009 | Sorensen | |
| 7,628,219 | B2 | 12/2009 | Frauhammer et al. | |
| D608,176 | S | 1/2010 | Heidelberger | |
| 8,060,987 | B1 * | 11/2011 | Troudt | B25G 1/04 16/427 |
| 8,132,296 | B2 * | 3/2012 | Di Nicolantonio | B25F 5/026 16/426 |
| D703,020 | S | 4/2014 | Zhu et al. | |
| 10,179,400 | B2 | 1/2019 | Furusawa et al. | |
| D869,928 | S | 12/2019 | Hsiao | |
| D894,703 | S | 9/2020 | White et al. | |
| D919,088 | S | 5/2021 | Fumex et al. | |
| 2003/0224729 | A1 | 12/2003 | Arnold | |
| 2004/0060274 | A1 * | 4/2004 | Thomas | B25F 3/00 56/12.7 |
| 2004/0163214 | A1 | 8/2004 | Cheng | |
| 2005/0161241 | A1 | 7/2005 | Frauhammer et al. | |
| 2005/0248303 | A1 | 11/2005 | Garcia et al. | |
| 2007/0212991 | A1 | 9/2007 | Izmailov | |
| 2008/0102739 | A1 * | 5/2008 | Sun | B24B 23/026 451/358 |
| 2010/0258609 | A1 | 10/2010 | Lee | |
| 2011/0114346 | A1 | 5/2011 | Suzuki et al. | |
| 2013/0047799 | A1 | 2/2013 | Gareis | |
| 2013/0055860 | A1 | 3/2013 | French | |
| 2013/0142563 | A1 * | 6/2013 | Sumi | A01D 34/902 403/109.1 |
| 2013/0162188 | A1 | 6/2013 | Koeder | |
| 2014/0231113 | A1 | 8/2014 | Steurer | |
| 2014/0270908 | A1 * | 9/2014 | Hiller | B24B 23/005 403/103 |
| 2014/0366420 | A1 | 12/2014 | Hager | |
| 2017/0174374 | A1 | 6/2017 | Figiel et al. | |
| 2017/0259446 | A1 | 9/2017 | Skinner et al. | |
| 2018/0236629 | A1 * | 8/2018 | Gonzalez | B24B 23/005 |
| 2018/0295584 | A1 | 10/2018 | Gliner et al. | |
| 2020/0324380 | A1 * | 10/2020 | Brewster | B25F 5/026 |
| 2020/0406443 | A1 * | 12/2020 | Hoffman | F16B 7/0426 |

FOREIGN PATENT DOCUMENTS

| | | | |
|---|---|---|---|
| DE | 10238710 | A1 | 3/2004 |
| DE | 10347945 | A1 | 5/2005 |
| DE | 102015014559 | A1 | 5/2016 |
| EP | 1136188 | A2 | 9/2001 |
| EP | 1302281 | A1 | 4/2003 |
| EP | 2937184 | A1 | 10/2015 |
| EP | 3533313 | A1 | 9/2019 |
| EP | 3785862 | A1 | 3/2021 |

OTHER PUBLICATIONS

Extended European Search Report for European Application No. 20192574.0, dated Nov. 19, 2020.

"Industrial Tools." Ingersoll Rand., Jul. 17, 2015 [online], [retrieved on Oct. 4, 2021]. Retrieved from the Internet URL: http://w ingersollrand.jp/pdf/tool/tool_catalog_09 .pdf.

Laura J. Wilson. "The Best Air Hammer in 2019." Best Gaming Pro., Nov. 3, 2019 [online], [retrieved on Oct. 4, 2021]. Retrieved from the Internet https://bestgamingpro.com/best-air-hammer/.

European Search Report for Application No. 21197896.0, dated Mar. 7, 2022.

Office Action in Europe for Application No. 21197896.0, dated Mar. 10, 2023.

Office Action in China for Application No. 202010870796.1, dated Jul. 28, 2023.

* cited by examiner

QUICK CHANGE AUXILIARY HANDLE FOR POWER TOOL

CROSS-REFERENCE TO RELATED APPLICATIONS

The present application is a continuation-in-part under 35 U.S.C. § 120 of U.S. patent application Ser. No. 16/552,227, filed Aug. 27, 2019, and titled “Tool with Wireless Switch.” U.S. patent application Ser. No. 16/552,227 is herein incorporated by reference in its entirety.

BACKGROUND

Portable (hand-held) power tools include a variety of tools, which are actuated by a power source such as an electric or pneumatic motor, that are configured to be held by an operator during use. Depending on the application in which they are used, portable power tools vary greatly in size, torque, and speed of operation. Because they are hand-held, portable power tools used in high load/torque applications are often equipped with stability and/or safety features typically not utilized in power tools used in lower load/torque applications.

DRAWINGS

The Detailed Description is described with reference to the accompanying figures. The use of the same reference numbers in different instances in the description and the figures may indicate similar or identical items.

Figure 8:
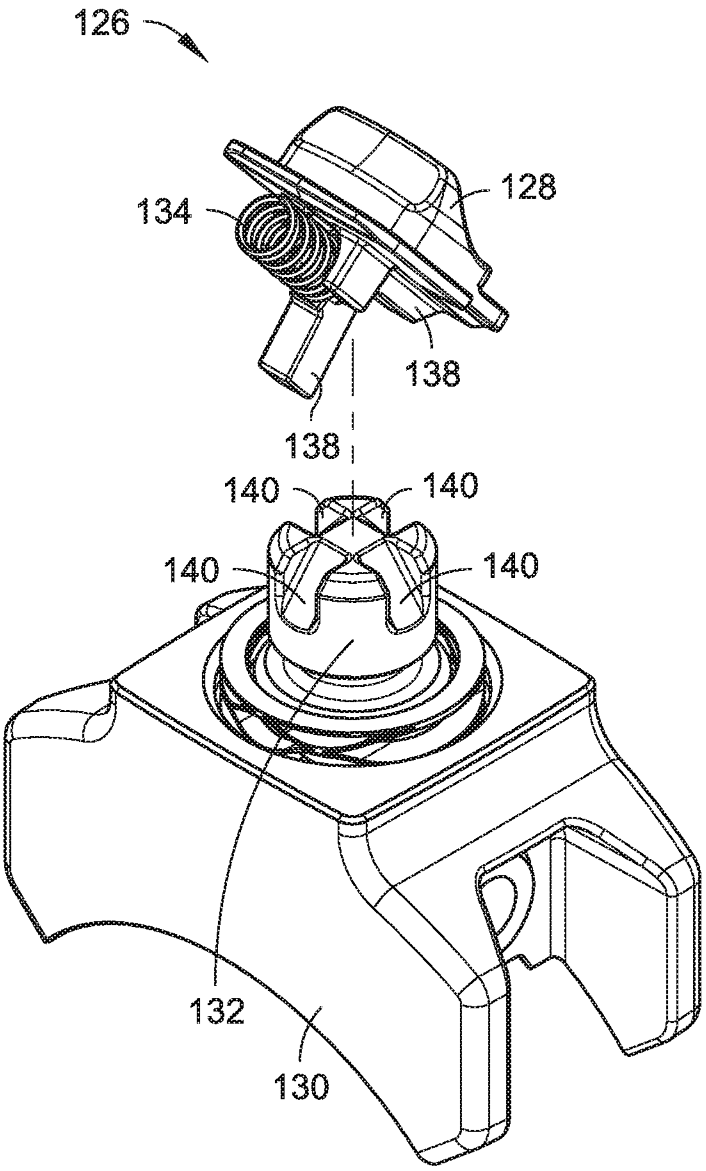
Figure 9:
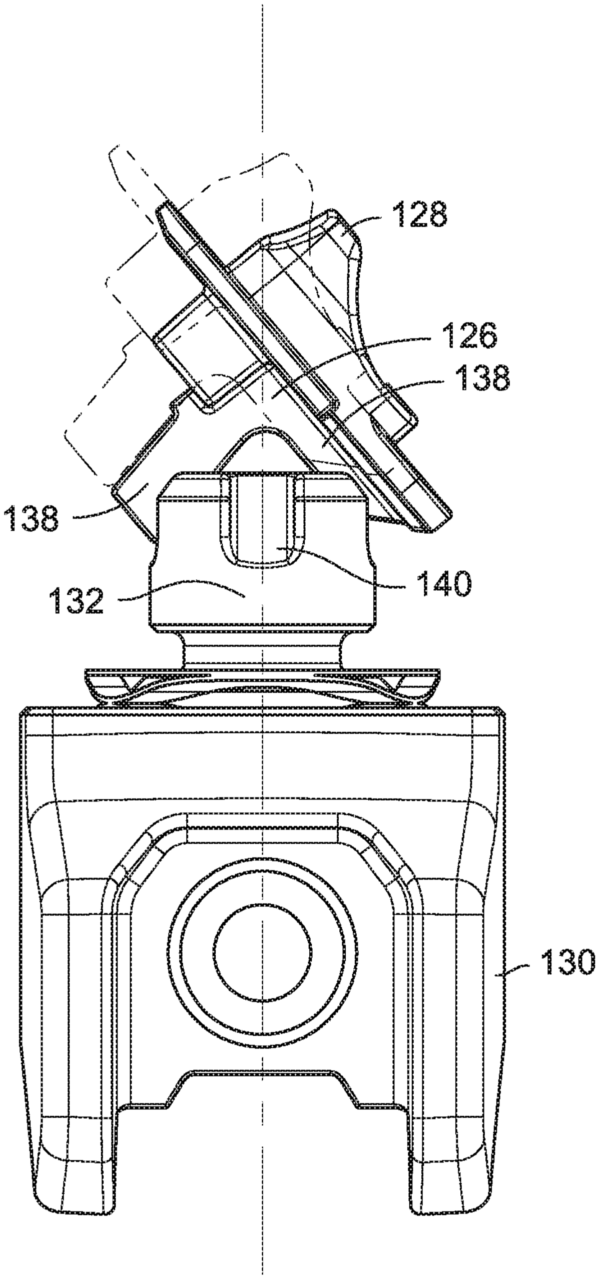
Figure 10:
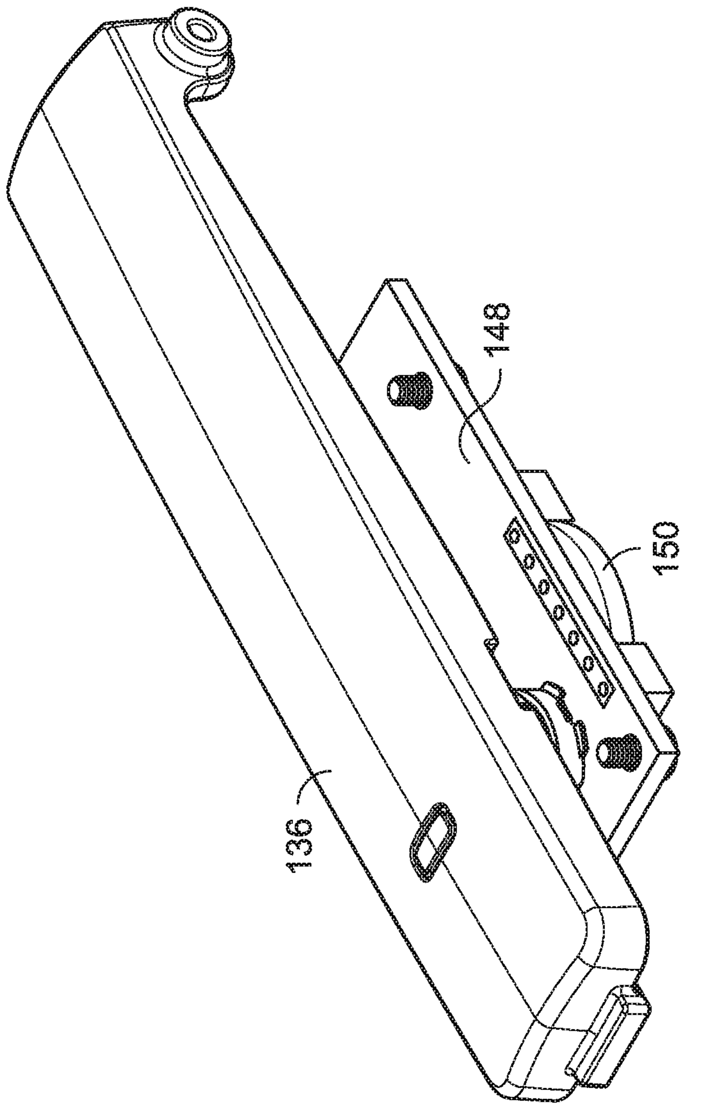

FIG. 8 is an exploded view of a slidable latching mechanism and a handle base in accordance with example embodiments of the present disclosure FIG. 9 is a side view of the slidable latching mechanism engaging the handle base shown in FIG. 8 in accordance with example embodiments of the present disclosure FIG. 10 is an isometric view of a secondary switch of an auxiliary handle assembly and a printed circuit board in accordance with example embodiments of the present disclosure.

Figure 11:
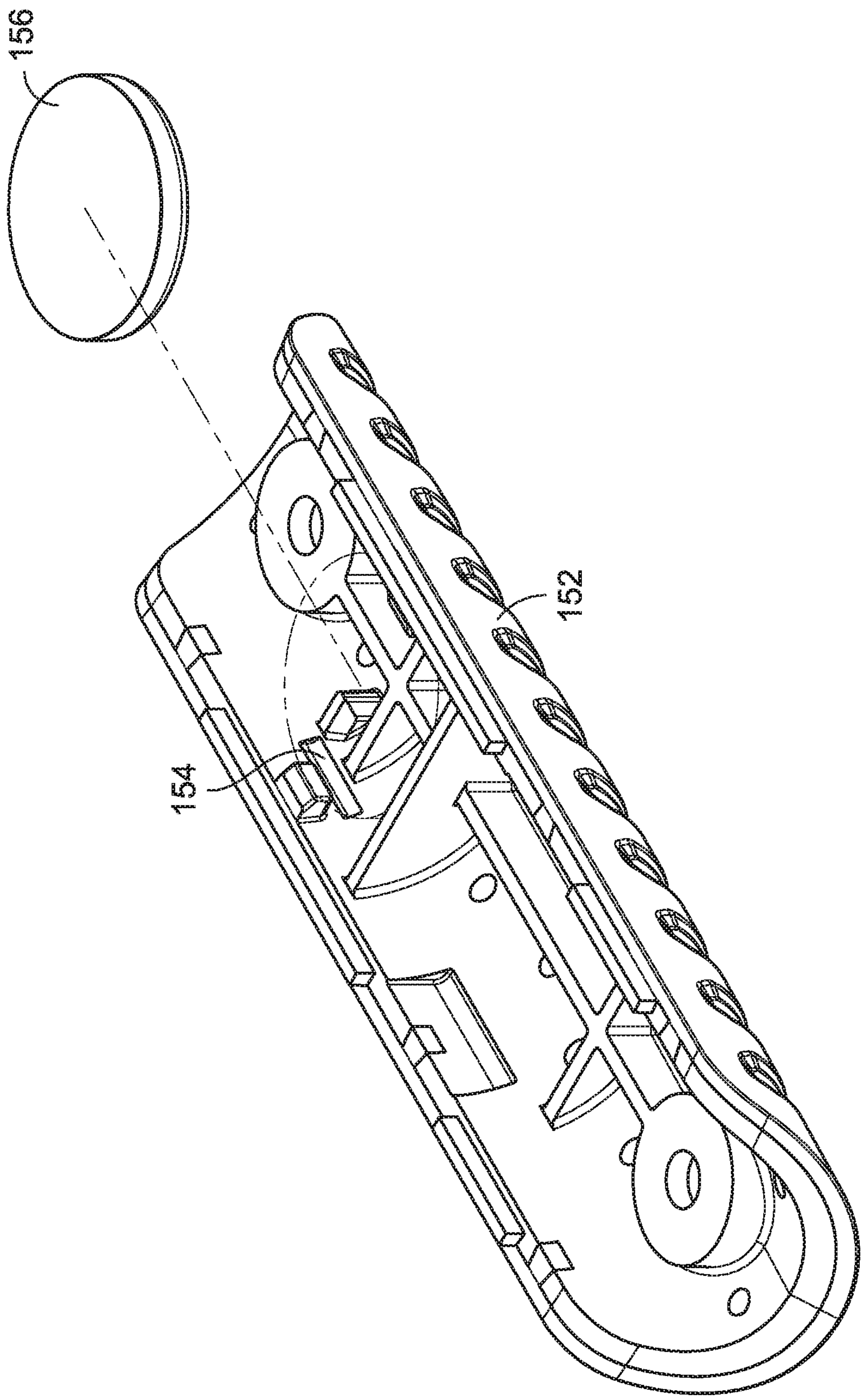

FIG. 11 is an isometric view of a battery cover and a spare battery in accordance with example embodiments of the present disclosure.

Figure 12:
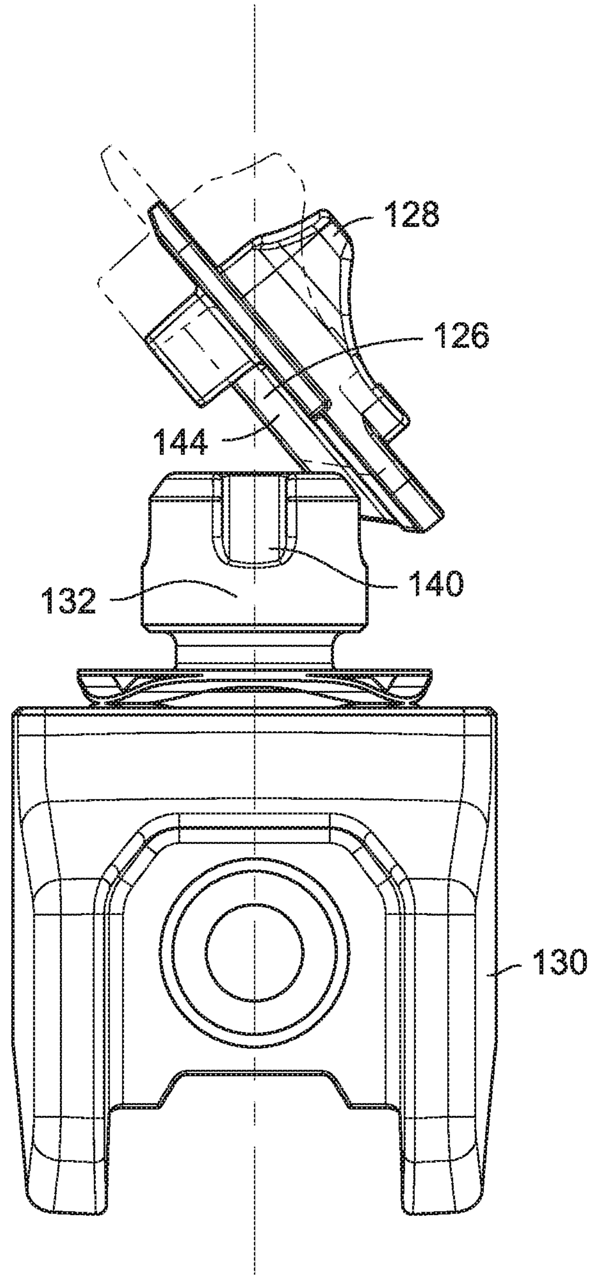

FIG. 12 is an isometric view of a slidable latching mechanism and a handle base in accordance with a second example embodiments of the present disclosure

DETAILED DESCRIPTION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

Overview

Portable power tools vary in size, torque, and speed. Heavy duty power tools have auxiliary handles that allow the user to better position, balance, and control the generally larger and heavier tools during use. Secondary or auxiliary handles also provide additional safety measures to the operation of power tools. Auxiliary handles often are configured to provide preventative measures to help prevent users from experiencing accidental injuries from the tool. For example, holding a high-torque drill having an auxiliary handle in addition to a pistol grip gives an operator increased stability when reactive forces act on the tool. However, auxiliary handles positioned to facilitate use of the tool may be uncomfortable or impractical to use in some situations or may cause the tool to be awkward to carry and/or store when not in use.

Accordingly, the present disclosure is directed to a power tool having an adjustable auxiliary handle assembly that facilities use of the tool by the operator while allowing convenient carry and storage of the tool when not in use. In embodiments, the adjustable auxiliary handle assembly comprises an indexing mechanism that includes an angled connector, a slidable latching mechanism and a handle base. The indexing mechanism allows a longitudinal handle to rotate and be locked in a position convenient and comfortable to the operator. The indexing mechanism is easily adjustable and can be operated with one hand (e.g., one-handed operation). The latching mechanism holds the auxiliary handle position in place while allowing the power tool to be used in high-torque/high load applications. In embodiments, the adjustable auxiliary handle assembly includes a second switch configured to be used in conjunction with the tool's primary (trigger) switch. In such embodiments, the secondary switch is pressed in conjunction with (e.g., simultaneously with) the trigger switch of the power tool before the tool will operate to ensure that the power tool operator is properly holding the power tool with both hands.

DETAILED DESCRIPTION OF EXAMPLE EMBODIMENTS

FIGS. 1 through 12 illustrate a power tool assembly 100 having an auxiliary handle assembly in accordance with example embodiments of the present disclosure. In the illustrated embodiment, the power tool assembly 100 comprises a portable hand-held power tool 102 to which the auxiliary handle assembly 108 is mounted. The portable hand-held tool 102 includes a drive mechanism 104. In embodiments, the drive mechanism 104 comprises an electric motor (not shown) powered by power source such as a removable battery (in the configuration shown), an internal battery or an external power source via an electric cord. However, it is contemplated that the portable hand-held power tool 102 may also comprise a pneumatic tool having a drive mechanism 104 employing a pneumatic (compressed air) motor powered by a source of compressed air.

The portable hand-held power tool 102 further includes a first handle 106 having a trigger switch 110. The first handle 106 is configured to allow the operator to hold the power tool 102 by one hand while operating (pressing and depressing) the trigger switch 110. The trigger switch 110 causes the electric motor (or pneumatic motor) of the drive assembly 102 to be turned on and off (e.g., depressing the trigger switch 100 causes electrical power to be applied to the electric motor turning it on, while releasing the trigger switch 100 causes electrical power to be removed from the electric motor turning it off).

The portable hand-held power tool 102 further includes a gear assembly coupled with the drive mechanism 104. The gear assembly comprises a gear train that transmits torque (driving power) from the drive mechanism 104 to the working tool element 105 via an output drive 124. In some embodiments, the gear assembly may include a clutch mechanism that operates to prevent over-torque of the working tool element 104 and workpiece.

The output drive 124 transfers torque received from the drive mechanism 104 and gear assembly to the working tool element 105 so that torque may be imparted to a workpiece (e.g., a nut, screw, bolt, etc.). In the embodiment illustrated, the working tool element 105 comprises a high torque nut runner. However, those of skill in the art will understand that the working tool element 105 is not necessarily limited to the working tool element 105 illustrated, and that a variety of different elements that may require an auxiliary handle when in use may be used in conjunction with drive mechanism 102 of the power tool assembly 100. For example, other working tool elements 105 suitable for used by the power tool 102 can include, but are not limited to, nut runner tools, impact wrenches, grinders, drills, combination hammers, and so forth.

In the embodiment illustrated, the portable hand-held power tool 102 includes a housing 120 that supports and contains the drive mechanism 105 and the gear assembly. The housing 120 shown employs a pistol grip design wherein the first handle 106 comprises a pistol type grip that is generally perpendicular to the axis of rotation of the output drive 124. As shown, the housing 120 includes the first handle 106 configured to be grasped by an operator when using the power tool assembly 100. For example, the first handle 106 may be used by the operator to pick up the power tool assembly 100, move it and guide it onto a workpiece. The first handle 106 allows the operator to impart force to hold the power tool assembly 100 against the workpiece. In the embodiment illustrated, the first handle 106 includes the trigger switch 110 that turns the electric motor within drive mechanism 102 on and off to produce torque at the output drive 124. The trigger switch 110 shown comprises a push button "trigger" switch configured to be depressed and released by the operator's index finger while holding the first handle 106. However, it is contemplated that the trigger switch 110 may comprise a hinged lever switch, a toggle switch, a rocker switch, a rotary switch, a slide switch, etc. The housing 120 further includes a gearcase 122 that encloses the gear assembly. In the embodiment shown, the gearcase has a generally cylindrical shape. However, in other embodiments, the gearcase 122 may be have a squared shape, a rectangular shape, an oval shape, an irregular shape, and so forth. Moreover, the shape of the gearcase may differ depending on the working tool element 104 used in the power tool assembly 100 and is not limiting to the present disclosure.

In accordance with the present disclosure, the power tool assembly 100 includes an auxiliary handle assembly 108. The auxiliary handle assembly 108 allows the operator to resist the torque output of the power tool assembly 100 in high torque operations. As shown more specifically in FIGS. 1 through 5, the auxiliary handle assembly 108 is coupled to the housing 120. Other configurations of the power tool assembly 100 may include an auxiliary handle assembly 108 that is coupled to the working tool element 104 instead of the housing 120.

Figure 5:
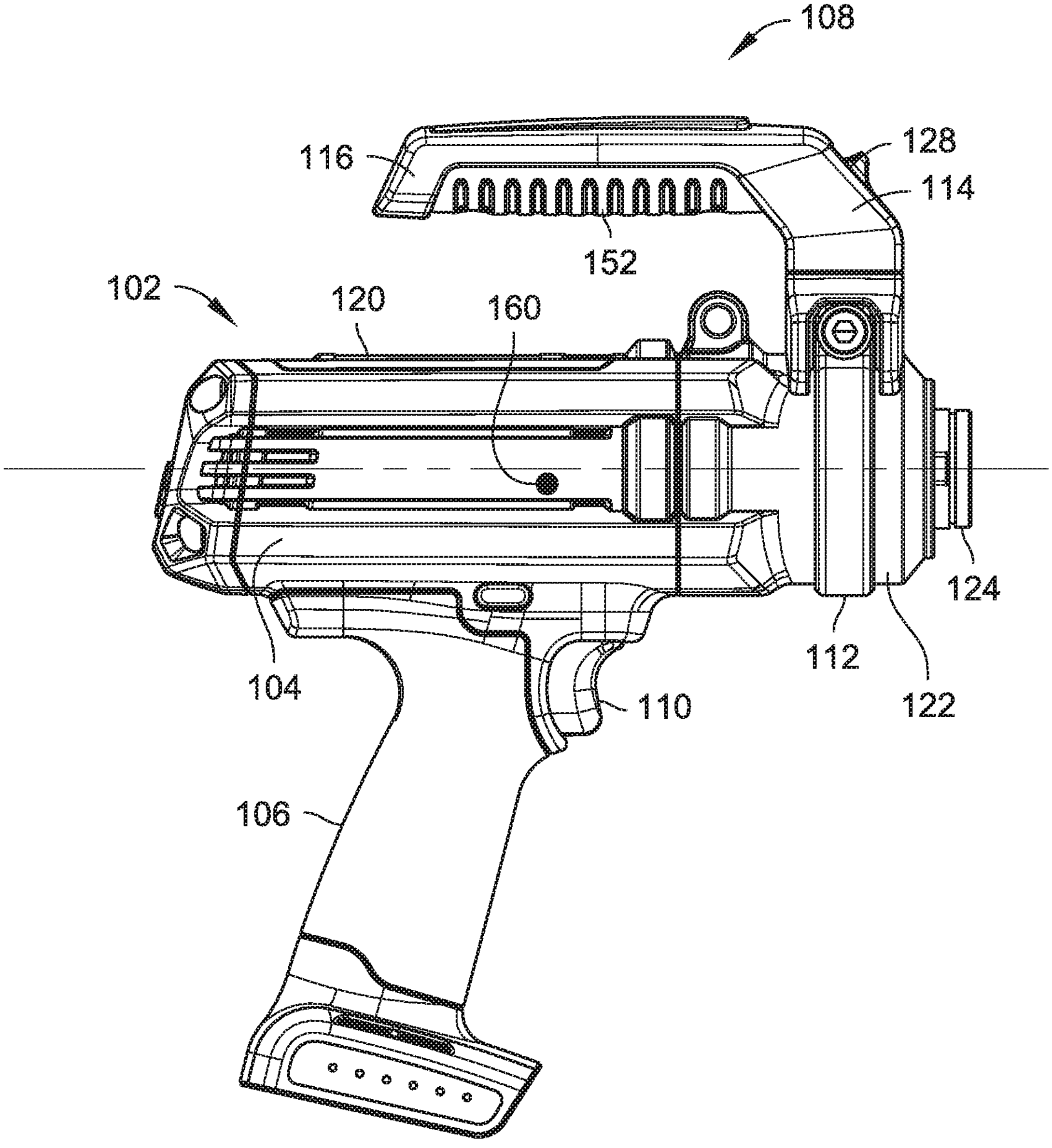
FIG. 5 is a side view of the power tool with the auxiliary handle assembly shown in FIG. 1.
Figure 6:
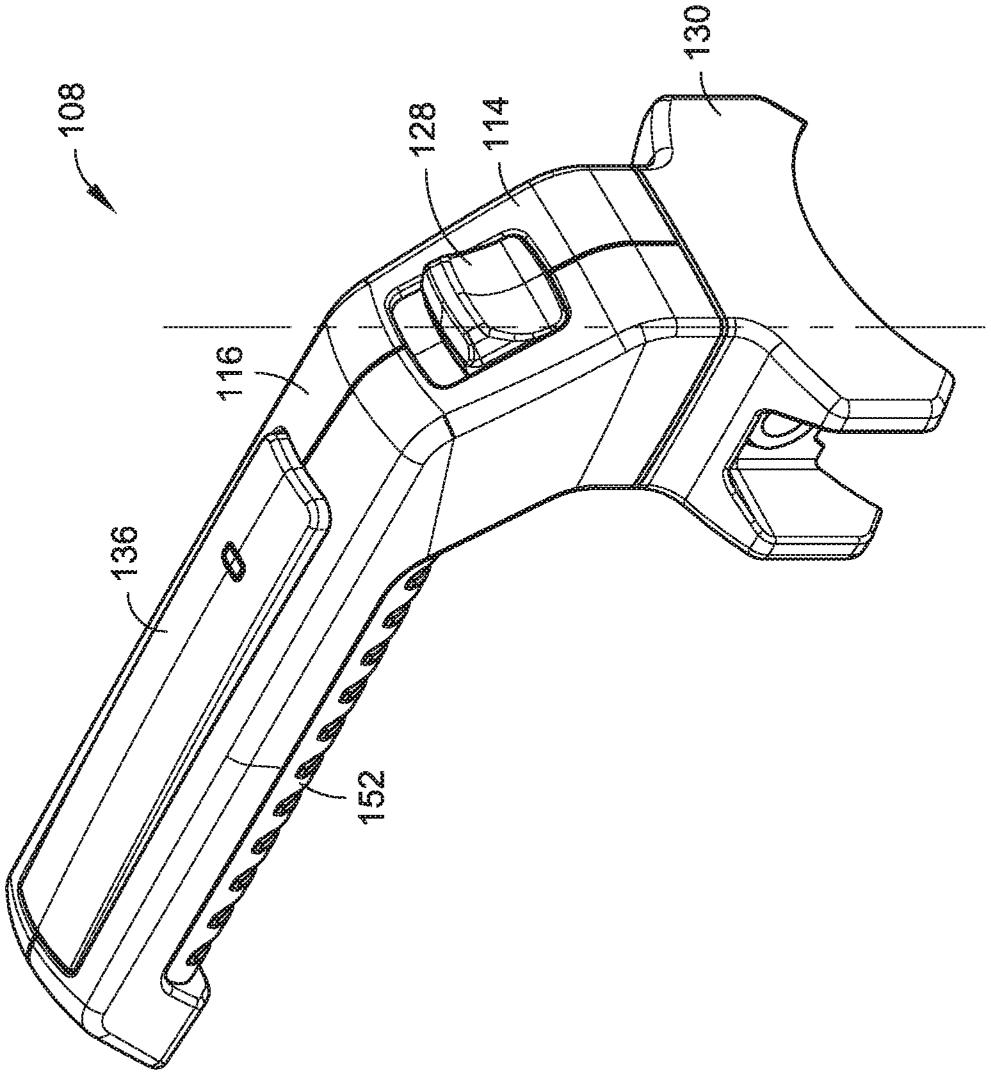
FIG. 6 is an isometric view of an auxiliary handle assembly in accordance with example embodiments of the present disclosure.

Referring to FIGS. 5 and 6, the auxiliary handle assembly 108 includes a band 112, a handle base 130, an angled connector 114, and a longitudinal handle 116. The angled connector 114 is fixedly connected to the extending longitudinal handle 116. The handle base 130 is rotatably connected to the angled connector 114 for supporting the longitudinal handle 116. The angled connector 114 connects to the extending longitudinal handle 116 at an angle of approximately forty-five degrees (45°) so that the longitudinal handle does not accidentally hit a working surface or the exterior of the housing 120. However, in embodiments, the auxiliary handle assembly 108 may connect with the longitudinal handle 116 at an angle other than forty-five degrees (45°).

Figure 7:
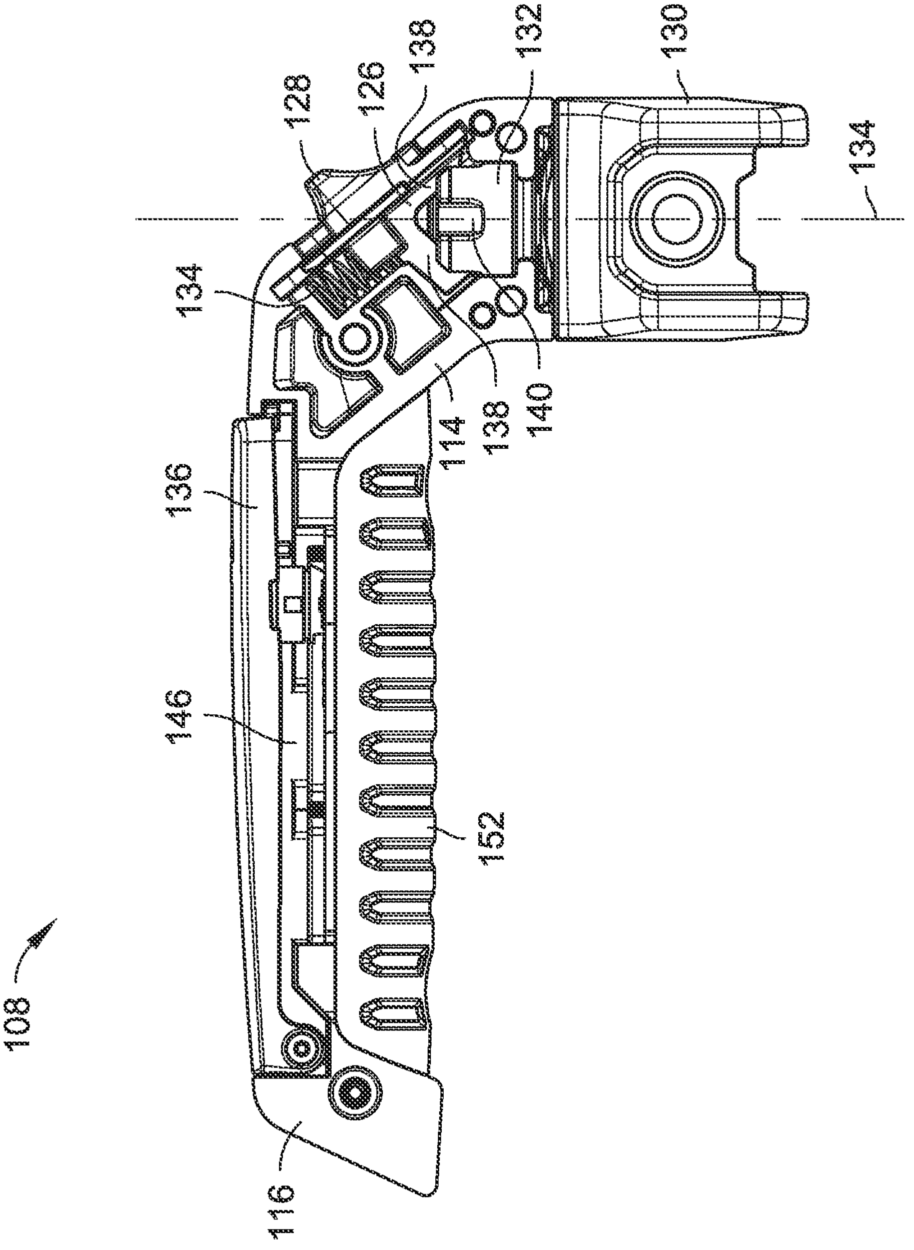
FIG. 7 is a cross-sectional view of the auxiliary handle assembly shown in FIG. 6 in accordance with example embodiments of the present disclosure.

Referring to FIGS. 7 through 9, components of the auxiliary handle assembly 108 are described. In the embodiment shown, the auxiliary handle assembly 108 includes a slidable latching mechanism 126 housed by the angled connector 114. The slidable latching mechanism 126 includes a sliding button 128 accessible on the angled connector 114 for actuating the slidable latching mechanism 126 to rotate the longitudinal handle 116.

In embodiments, the sliding latching mechanism 126 comprises a bevel gear assembly that includes one or more beveled teeth 138 that extend from the slidable latching mechanism 126 and engage with a notched receiver 132 housed in the handle base 130. As shown, the notched receiver 132 includes a plurality of beveled notches 140 formed therein that extend away from the notched receiver 132 and are parallel to the axis of rotation 134 of the longitudinal handle 116. In operation, the teeth 138 of the slidable latching mechanism 126 are rotatably secured by the notched receiver 132 via the plurality of notches 140 that extend from the notched receiver 132. The handle base 130 provides torque support to the longitudinal handle 116 when the teeth 138 are engaged with notches 140 the notched receiver 132 to prevent rotation of the longitudinal handle 116.

In the embodiment shown in FIGS. 7 through 9, the slidable latching mechanism comprises a bevel gear assembly that includes at least two opposed teeth 138, which hold the slidable latching mechanism 126 in engagement with the notched receiver 132. Having at least two opposed teeth 138 allows the longitudinal handle 116 to be rigidly kept in the desired position relative to the handle base 130 without movement when the power tool assembly 100 is used in high-torque applications.

However, in other embodiments, the power tool assembly 100 may be configured for use in relatively low reaction load applications. FIG. 12, illustrates an auxiliary handle assembly 108 for a power tool assembly 100 configured for use in a low reaction load application in accordance with example embodiments of the present disclosure. In such embodiments, the auxiliary handle assembly 108 may comprise a slidable latching mechanism 126 that includes a bevel gear assembly having a single beveled tooth 144 that engages with the plurality of notches 140 of the notched receiver 132.

In the embodiments illustrated, the slidable latching mechanism 126 is biased towards the handle base 130 by a helical compression spring 134. When engaged with the notched receiver 132, the teeth 138 lock the position of the longitudinal handle 116 with respect to the handle base 130. By activating the sliding button 128 of the angled connector 114 (e.g., pressing and/or sliding the sliding button upward away from the handle base 130 (and power tool 102 (FIG. 1)), the operator can disengage the slidable latching mechanism 126 from the notched receiver 132 (i.e., disengage the teeth 138 from the notches 140) to allow rotating the longitudinal handle 116. The longitudinal handle 116 may then be locked into a desired position by releasing the sliding button 126 allowing the compression spring 134 to bias the slidable latching mechanism 126 into engagement with the notched receiver 132. Although a helical compression spring 134 is shown and described as being used to bias slidable latching mechanism 126 into engagement with the notched receiver 132 in the example embodiment shown, it is contemplated that other biasing mechanisms may be used to bias the slidable latching mechanism 126 in the direction of the notched receiver 132 of the handle base 130.

In other embodiments, the power tool 100 may be configured for a low reaction load application. FIG. 12, illustrates an example embodiment of a power tool 100 configured for use in a low reaction load applications. As shown, the power tool 100 includes a slidable latching mechanism 126 that includes at least one tooth 144 that engages with the plurality of notches 140 of the notched receiver 132.

Figure 1:
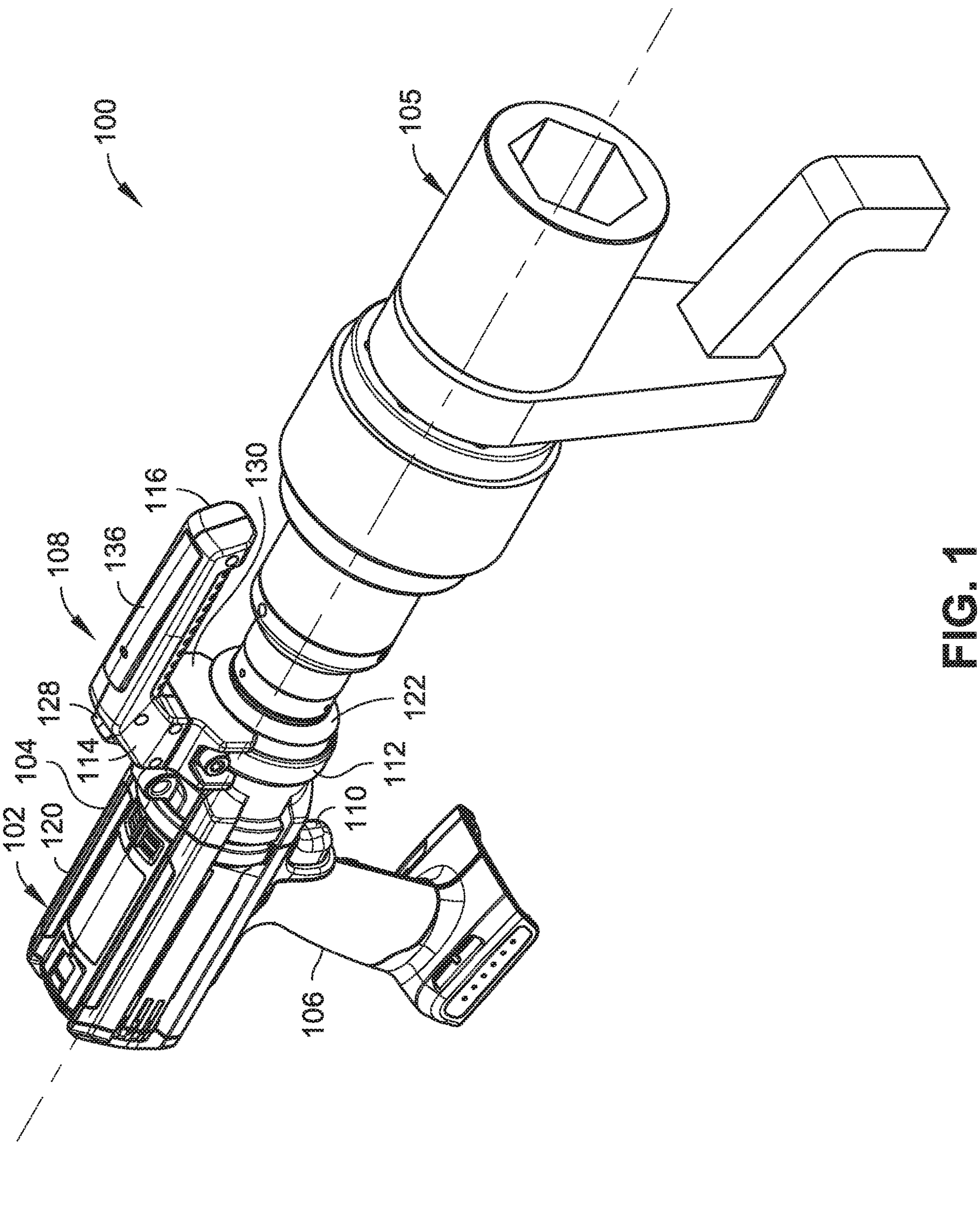
FIG. 1 is an isometric view of a power tool with an auxiliary handle assembly in accordance with example embodiments of the present disclosure.
Figure 2:
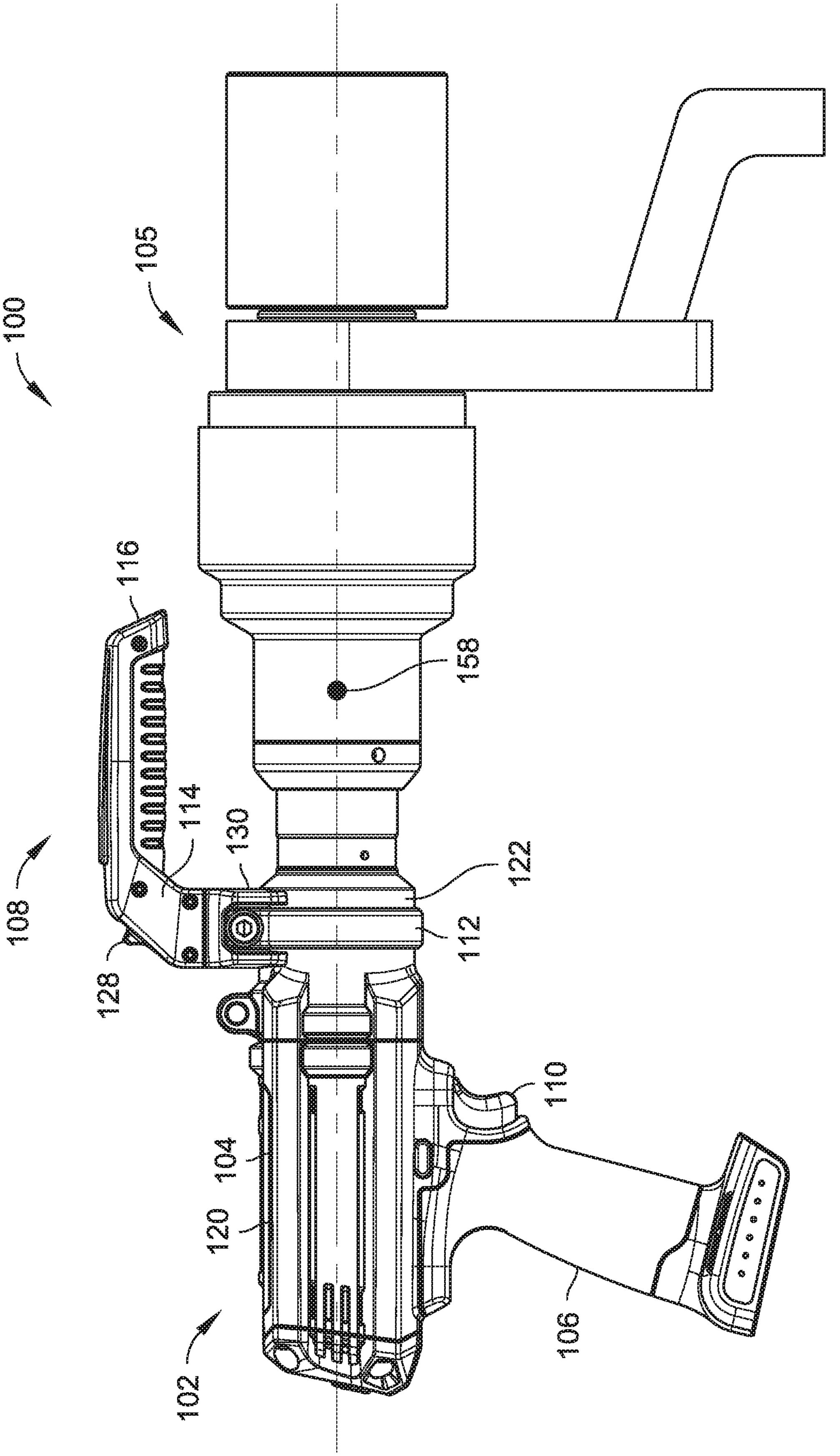
FIG. 2 is a side view of the power tool with an auxiliary handle assembly shown in FIG. 1.
Figure 3:
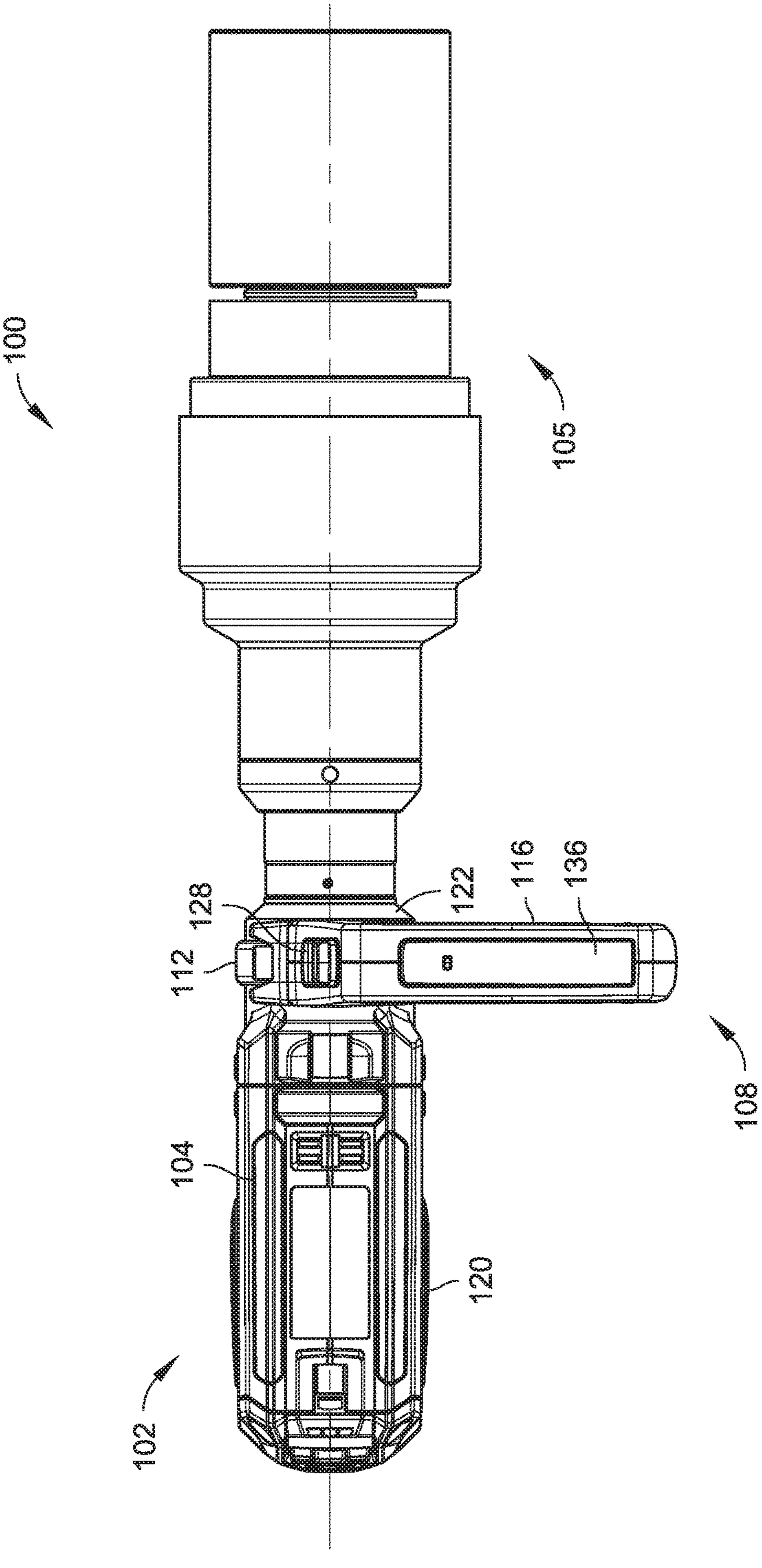
FIG. 3 is a top view of the power tool shown in FIG. 1 illustrating a first configuration of the auxiliary handle assembly in accordance with example embodiments of the present disclosure.
Figure 4:
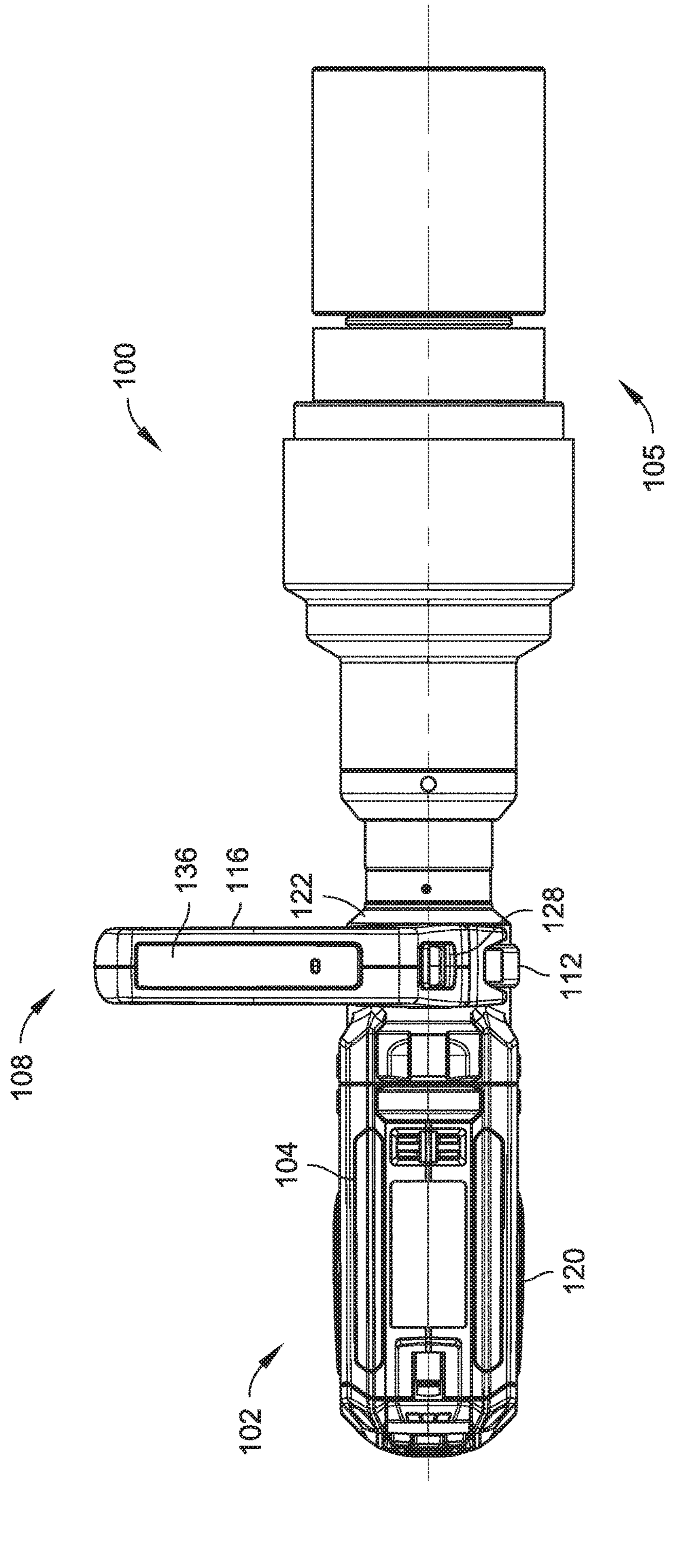
FIG. 4 is a top view of the power tool shown in FIG. 1 illustrating a second configuration of the auxiliary handle assembly as in accordance with example embodiments of the present disclosure.

Referring again to FIGS. 1 through 5, rotation of the longitudinal handle 116 of the auxiliary handle assembly 108 is described. In FIG. 3, longitudinal handle 116 is shown rotated to a position that is perpendicular to an axis extending through the length of power tool assembly 100 and is located to the left with respect to the longitudinal axis. In FIG. 4, the longitudinal handle 116 is shown rotated to a position to the right with respect to the longitudinal axis of the power tool assembly 100. As shown in the figures, the longitudinal handle 116 can be rotated about an axis of rotation 134 with respect to the handle base 130. Rotating the longitudinal handle 116 to either sides of the power tool assembly 100 allow left-handed and right-handed users to effectively hold the power tool assembly 100 in position while the tool is in operation.

As discussed herein above, the operator disengages the slidable latching mechanism 126 from the handle base 130 by pressing and/or sliding the sliding button 128 causing the slidable latching mechanism 126 to be disengaged from the notched receiver 140 within the handle base 130, and allowing the longitudinal handle 116 to be rotated about an axis of rotation 134 extending through the handle base 130 generally perpendicular to the longitudinal axis of the power tool assembly 100. In embodiments, the longitudinal handle 116 can be rotated a though a full three hundred sixty degree (360°) arc about the axis of rotation 134. In embodiments, the longitudinal handle 116 is indexable to a plurality of positions with respect to the handle base 130. In this manner, the power tool assembly 100 may be made ambidextrous (i.e., for comfortable use by both right-handed and left-handed operators), as longitudinal handle 116 can be repositioned according to the preference of the operator/user. The longitudinal handle 116 can also be rotated to be generally parallel to the longitudinal axis of the power tool assembly 100 to facilitate carrying and/or storage of the power tool assembly 100.

In embodiments, the beveled notches 140 of the notched receiver 132 are equidistantly spaced about the axis of rotation 134 to provide indents for positioning of the longitudinal handle 116. In the embodiment shown, adjacent ones of these indents (about the axis of rotation 134) are separated from one another by ninety degree (90°) incidents, aligned with the direction of the plurality of notches 140 extending from notched receiver 132. For example, in FIG. 8, the four notches 140 that extend from the notched receiver 132 are arranged in quadrants separated by ninety degree (90°) incidents. However, it is contemplated that the position and number of the plurality of notches 140 are not necessarily limited to the example embodiment shown. Thus, the handle base 130 may have less notches or more notches and thus less or more positioning indents than illustrated in FIG. 8. In such embodiments, adjacent notches may be separated by more than ninety degree (90°) incidents or by less than ninety degree (90°) incidents respective to the number of notches 140. Moreover, in such embodiments, the longitudinal handle 116 is indexable to a plurality of positions respective to the plurality of notches 140 extending from notched receiver 132.

As shown in FIG. 5, a band 112 extends around the gearcase 122 to secure the auxiliary handle assembly 108 to the housing 120 of the portable hand-held power tool 102. The handle base 130 is removably secured to the band 112, which allows the auxiliary handle assembly 108 to be rotated and fixed about the longitudinal axis of power tool assembly 100. In one example embodiment, the band 112 comprises a split clamp ring that is tightened onto the front of the housing 120 with one or more fasteners (e.g, threaded fasteners such as screws or bolts). In some embodiments (not shown), the exterior surface of the gearcase 122 includes knurling to increase the friction between the band 112 and the gearcase 122 to secure the auxiliary handle assembly 108 in position with respect to the housing 120.

Referring to FIGS. 6 through 7, an embodiment of the auxiliary handle assembly 108 is shown. The auxiliary handle assembly includes longitudinal handle 116, angled connector 114 including sliding button 128 and handle base 130. The orientation of the sliding button 128 with respect to longitudinal handle 116 is ergonomically designed to allow the user to actuate the button 128 with just his/her thumb while holding the longitudinal handle 116, thus resulting in one-handed operation. Additionally, the plane of the button 128 is angled to prevent inadvertent actuation.

The auxiliary handle assembly 108 described in the present disclosure also accommodates various gearcase sizes and thus may be adapted for used on power tools 102 having various working tool element sizes. In embodiment, the auxiliary handle assembly 108 can be rotated when being carried by the operator so that the power tool assembly 100 is balanced beneath the handle 108 with respect to the power tool assembly's center of gravity. By decreasing the longitudinal distance between the auxiliary handle assembly 108 and the center of gravity of the power tool assembly 100, the operator can maintain a balanced hold of the power tool assembly 100 without excess strain to the user's hand. For example, the longitudinal handle 116 may be configured to be positioned generally aligned to the housing 120 along the longitudinal axis of the power tool assembly 100 when using the longitudinal handle 116 to carry the power tool assembly 100, as shown in FIGS. 2 and 5, respectively. Moreover, for heavier working tool elements 104 as shown in FIG. 2, the handle 116 can be oriented toward the front of the power tool assembly 100, putting the user's hand closer to the center of gravity 158 of the power tool assembly 100. However, as shown in FIG. 5, for lighter gear boxes or working tool elements, the longitudinal handle 116 can be rotated toward the back of the power tool assembly 100, to put the user's hand closer to the center of gravity 160 of the lighter power tool assembly 100. In this manner, the weight of the power tool assembly 100 may be better distributed when carrying the power tool assembly 100, for example, while moving from one site to another in a workplace.

In some embodiments, as is shown in FIG. 6, the auxiliary handle assembly 108 may include a second switch 136 that serves as an interlock to prevent undesired operation of the power tool 102. In operation, the electric motor within drive assembly 102 does not turn on to furnish output torque for the power tool 100 until both the trigger switch 110 and the second switch 136 are simultaneously actuated. Thus, to operate the tool, the user places one hand on each handle 106 and 108 and simultaneously actuates both switches 110, 136 (e.g., causes both switches 110, 136 to be actuated at the same time even though one switch may be actuated before the other) to turn the power tool assembly 100 on. The trigger switch 110 and second switch 136 may further turn off the electric motor within the drive assembly 102 when either the trigger switch 110 or the second switch 136, or both switches 110, 136 are released by the operator. Thus, the operator is made to keep both hands on the power tool assembly 100 to simultaneously depress both switches 110 and 136 during operation of power tool assembly 100. In embodiments, the second switch 136 may comprise a push button, a toggle switch, a rocker switch, a slide switch, etc.

Referring to FIG. 7, the auxiliary handle assembly 108 includes a cavity 146 within which a switch sensor circuit 148 is enclosed. The cavity 146 may also house a battery 150 to provide electrical power for the switch sensor circuit 148. For example, the cavity 146 may be configured to house a coin cell battery to minimize the size of the components in the auxiliary handle assembly 108 while providing sufficient battery 150 longevity. However, other types of batteries may be employed. A battery cover 152 that is configured to enclose the cavity 146 to facilitate replacement of the battery 150 is shown in FIG. 11. As shown, the inside of the battery cover 152 may have a slot 154 configured to store a spare battery 156.

The switch sensor circuit 148 of the auxiliary handle assembly 126 is shown in FIG. 10. In embodiments, the switch sensor circuit 148 comprises a printed circuit board (PCB) supporting control circuitry and includes an antenna to transmit a wireless signal to a tool controller, or a supervisory control system, within the power tool 102 to indicate that the second switch 136 has been actuated. The electric (or pneumatic) motor is enabled when the trigger switch 110 has been pressed and when the switch sensor circuit 148 transmits a wireless signal indicating that the second switch 136 has been actuated. In embodiments where the wireless signal from the auxiliary handle assembly 108 is received directly by the tool controller in the power tool 02, the transmission distance is short (e.g., less than one to two (1-2) feet). Thus, in this arrangement the power level of the wireless transmitter may be reduced to limit the transmission distance to less than a very short distance (e.g., 10 feet or less). As shown, the antenna of the auxiliary handle assembly 108 to be only a conductive trace on the printed circuit board of the switch sensor circuit 148 PCB, especially since the transmission distance is very short in the case of direct communication with the tool controller.

It is to be understood that the terms "operator" and "user" are used interchangeably herein to describe any who uses, operates, and/or transports the power tool assembly 100.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A power tool assembly comprising:

a drive mechanism for powering a working tool element;

a housing for supporting and retaining the drive mechanism; and an adjustable handle assembly including:

a longitudinal handle, an angled connector fixedly connected to and extending from the longitudinal handle, a slidable latching mechanism housed by the angled connector and including a button accessible on the angled connector for actuating the slidable latching mechanism, the slidable latching mechanism including at least two opposing teeth extending from the slidable latching mechanism, a handle base for supporting the longitudinal handle, the longitudinal handle having an axis of rotation with respect to the handle base, the handle base including a notched receiver configured to receive the at least two opposing teeth of the slidable latching mechanism for rotationally securing the longitudinal handle in place with respect to the handle base when the at least two opposing teeth are engaged with the notched receiver to index the longitudinal handle, the notched receiver including notches that extend to either side of the axis of rotation of the longitudinal handle for providing torque support to the longitudinal handle when the at least two opposing teeth are engaged with the notched receiver, and a band for connecting to the handle base, the band configured to extend around the housing to fixedly secure the handle assembly to the housing of the power tool assembly.

2. The power tool assembly as recited in claim 1, wherein the notched receiver comprises a bevel gear.

3. The power tool assembly as recited in claim 1, wherein the slidable latching mechanism is biased toward the handle base.

4. The power tool assembly as recited in claim 3, the slidable latching mechanism is biased toward the handle base by a compression spring.

5. The power tool assembly as recited in claim 1, wherein the longitudinal handle is indexable to a plurality of positions with respect to the handle base.

6. The power tool assembly as recited in claim 5, wherein adjacent positions of the plurality of positions are separated from one another by at least approximately ninety degrees.

7. The power tool assembly as recited in claim 5, wherein the plurality of positions includes at least two opposing positions at least generally aligned with the housing.

8. An adjustable handle for a power tool assembly, the adjustable handle comprising:

a longitudinal handle;

an angled connector fixedly connected to and extending from the longitudinal handle;

a slidable latching mechanism housed by the angled connector, the slidable latching mechanism including:

a button accessible on the angled connector for actuating the slidable latching mechanism and at least one tooth extending from the slidable latching mechanism;

a handle base for supporting the longitudinal handle, the longitudinal handle having an axis of rotation with respect to the handle base, the handle base including:

a notched receiver configured to receive the at least one tooth of the slidable latching mechanism for rotationally securing the longitudinal handle in place with respect to the handle base when the at least one tooth is engaged with the notched receiver to index the longitudinal handle, and notches on the notched receiver that extend to either side of the axis of rotation of the longitudinal handle for providing torque support to the longitudinal handle when the at least one tooth is engaged with the notched receiver.

9. The adjustable handle as recited in claim 8, further comprising a band connected to the handle base, the band configured to fixedly secure the handle assembly to a housing of a power tool assembly.

10. The adjustable handle as recited in claim 8, wherein the notched receiver comprises a bevel gear.

11. The adjustable handle as recited in claim 8, wherein the slidable latching mechanism is biased toward the handle base.

12. The adjustable handle as recited in claim 11, the slidable latching mechanism is biased toward the handle base by a compression spring.

13. The adjustable handle as recited in claim 8, wherein the longitudinal handle is indexable to a plurality of positions with respect to the handle base.

14. The adjustable handle as recited in claim 13, wherein adjacent positions of the plurality of positions are separated from one another by at least approximately ninety degrees.

15. The adjustable handle as recited in claim 13, wherein the plurality of positions includes at least two opposing positions at least generally aligned with the housing.

16. An adjustable handle for a power tool assembly, the adjustable handle comprising:

a longitudinal handle;

an angled connector fixedly connected to and extending from the longitudinal handle;

a slidable latching mechanism housed by the angled connector, the slidable latching mechanism including:

a button accessible on the angled connector for actuating the slidable latching mechanism and at least two opposing teeth extending from the slidable latching mechanism;

a handle base for supporting the longitudinal handle, the longitudinal handle having an axis of rotation with respect to the handle base, the handle base including:

a notched receiver configured to receive the at least two opposing teeth of the slidable latching mechanism for rotationally securing the longitudinal handle in place with respect to the handle base when the at least two opposing teeth are engaged with the notched receiver to index the longitudinal handle, and notches on the notched receiver that extend to either side of the axis of rotation of the longitudinal handle for providing torque support to the longitudinal handle when the at least two opposing teeth are engaged with the notched receiver, the longitudinal handle indexable to a plurality of positions with respect to the handle base, the plurality of positions including at least two opposing positions at least generally aligned with the housing.

17. The adjustable handle as recited in claim 16, wherein the notched receiver comprises a bevel gear.

18. The adjustable handle as recited in claim 16, wherein the slidable latching mechanism is biased toward the handle base.

19. The adjustable handle as recited in claim 18, the slidable latching mechanism is biased toward the handle base by a compression spring.

20. The adjustable handle as recited in claim 19, wherein adjacent positions of the plurality of positions are separated from one another by at least approximately ninety degrees.

* * * * *